United States Patent [19]

Ozaki

[11] Patent Number: 5,523,531
[45] Date of Patent: Jun. 4, 1996

[54] MULTI-DIRECTIONAL BUTTON ASSEMBLY WITH CENTER AND PERIPHERAL ARRANGED BUTTONS AND MICROSWITCHES

[75] Inventor: Arthur H. Ozaki, Escondido, Calif.

[73] Assignees: Sony Corporation, Tokyo, Japan; Sony Electronics, Inc., Park Ridge, N.J.

[21] Appl. No.: 363,657

[22] Filed: Dec. 22, 1994

[51] Int. Cl.⁶ .......................... H01H 9/02; H01H 13/02; H04N 5/64; H05K 7/00
[52] U.S. Cl. .......................... 200/5 R; 361/781; 455/347
[58] Field of Search .................. 200/1 R, 5 R, 200/3 A, 6 R, 6 A, 17 R, 18, 6 B, 6 BA, 6 BB, 6 C, 339, 343, 341, 342, 345; 361/781; 455/347

[56] References Cited

U.S. PATENT DOCUMENTS

| | | |
|---|---|---|
| 3,600,528 | 8/1971 | Leposavic ............................ 200/5 A |
| 3,742,157 | 6/1973 | Leposavic ............................ 200/5 A |
| 4,066,860 | 1/1978 | Kawasaki ......................... 200/5 A X |
| 4,394,546 | 7/1983 | Harumatsu ......................... 200/5 R |
| 4,520,240 | 5/1985 | Swindler ............................. 200/5 R |
| 4,638,151 | 1/1987 | Suwa ............................... 200/5 A X |
| 4,678,872 | 7/1987 | Gutman ............................... 200/5 R |
| 4,760,218 | 7/1988 | Gutman ............................... 200/5 R |
| 5,455,743 | 10/1995 | Mijajima ............................. 361/781 |

*Primary Examiner*—J. R. Scott
*Attorney, Agent, or Firm*—Blakely, Sokoloff, Taylor & Zafman

[57] ABSTRACT

A button assembly for a television receiver control box, wherein a center button is located within a cluster of outer buttons. The outer buttons are cantilevered from the truss of a button plate that is mounted to a printed circuit board which has a plurality of microswitches. Located within the cluster of outer buttons is a center button. The center button is cantilevered from a button bracket that is mounted to a front panel of the control box. The buttons extend through corresponding openings in the front panel. Each button has a column that engages a corresponding microswitch when the button is depressed.

10 Claims, 3 Drawing Sheets

MULTI-DIRECTIONAL BUTTON ASSEMBLY WITH CENTER AND PERIPHERAL ARRANGED BUTTONS AND MICROSWITCHES

BACKGROUND OF THE INVENTION

1. Field of the Invention

The present invention relates to a push button assembly for a television receiver control box.

2. Description of Related Art

There exist a digital satellite based broadcasting system marketed under the trademark DirecTV which provides television signals that are received by satellite dishes. The DirecTV system also provides programing schedules, option selections and other information which can be viewed and selected by the end user through a graphic user interface (GUI). The GUI is typically manipulated through a remote control device which transmits input information to a television receiver control box that is connected to both the television set and the satellite dish. The remote controller may have a plurality of multi-directional buttons which allow the end user to scroll along or across the graphic interface. The multi-directional buttons may be arranged in a clustered pattern that correspond to the direction of movement on the television screen. The remote controller may also have a "select" button which allows the end user to select an option provided by the GUI. To improve the ergonomics of the controller the select button is typically placed in the center of the multi-function buttons.

The buttons of a clustered button assembly are typically constructed from a single sheet of rubber which has a plurality of inserts embedded therein. The inserts cause the rubber to extend through openings in an outer plastic housing. The inserts are also coupled to microswitches mounted to a printed circuit board within the controller, wherein the end user can enter an input by depressing the protruding rubber and corresponding insert.

The television receiver control box may also have a companion set of select and multi-directional buttons that allow the end user to interface with the graphic interface even when the remote controller in inoperable or unavailable. The buttons are typically located on a front panel of the control box. It is desirable to place the companion buttons of the control box in the same arrangement as the buttons of the remote control. Therefore, if the remote controller has a select button in the center of a number of multi-directional buttons, it is also desirable to place a center select button on the control box.

The buttons typically cooperate with microswitches mounted to a printed circuit board. To prevent damage from static discharge it is desirable locate the circuit board a safe distance from the front panel. Unfortunately, the space between the front panel and the printed circuit board prevents the usage of a simple rubber sheet to create the multi-directional cluster and center select button arrangement typically found in a remote controller. Therefore it would be desirable to provide a button assembly for a control box that contains a cluster of outer buttons and a single center button located therein.

SUMMARY OF THE INVENTION

The present invention is a button assembly for a television receiver control box, wherein a center button is attached within a cluster of outer buttons. The outer buttons are cantilevered from the truss of a button plate that is mounted to a printed circuit board which has a plurality of microswitches. Located within the cluster of outer buttons is a center button. The center button is cantilevered from a button bracket that is mounted to a front panel of the control box. The buttons extend through corresponding openings in the front panel. Each button has a column that engages a corresponding microswitch when the button is depressed.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 2a is an perspective view of a button plate;

DETAILED DESCRIPTION OF THE INVENTION

Figure 1:
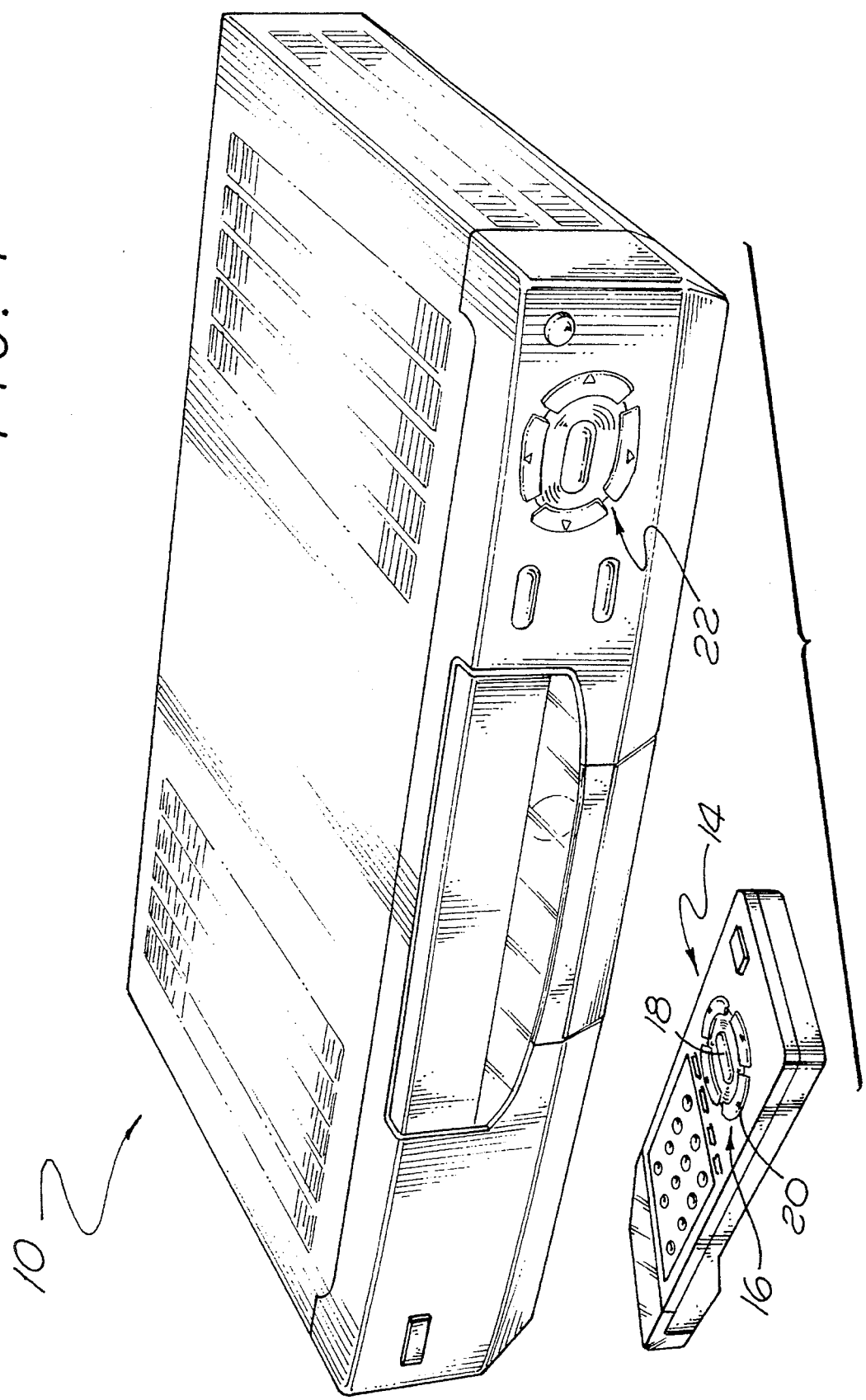
FIG. 1 is a perspective view of a television receiver control box.

Referring to the drawings more particularly by reference numbers, FIG. 1 shows a television receiver control box 10 of the present invention. The control box 10 can provide an interface between a television set (not shown) and a satellite (not shown). The control box 10 typically contains an infrared (IR) receiver that receives input from the transmitter of a remote controller 14. The remote controller 14 has a plurality of manually selectable buttons 16 that allow the end user to operate and interface with the television set.

The remote controller 14 may have a center "select" button 18 located within a cluster of multi-directional buttons 20. The multi-directional buttons 18 may allow the end user to "move" through a graphic user interface provided on the screen of the television set. The center "select" button 18 may allow the end user to select an option provided by the graphic user interface. The remote controller 14 contains control circuits which transmit information to the control box in response to the depression of the buttons 16. The control box 10 has a similar pattern of buttons 22 which correspond to the select and multi-directional buttons of the remote controller 14. The control box buttons 22 typically provide the same input functions as the input functions of the select/multi-directional buttons of the remote controller 14.

Figure 2:
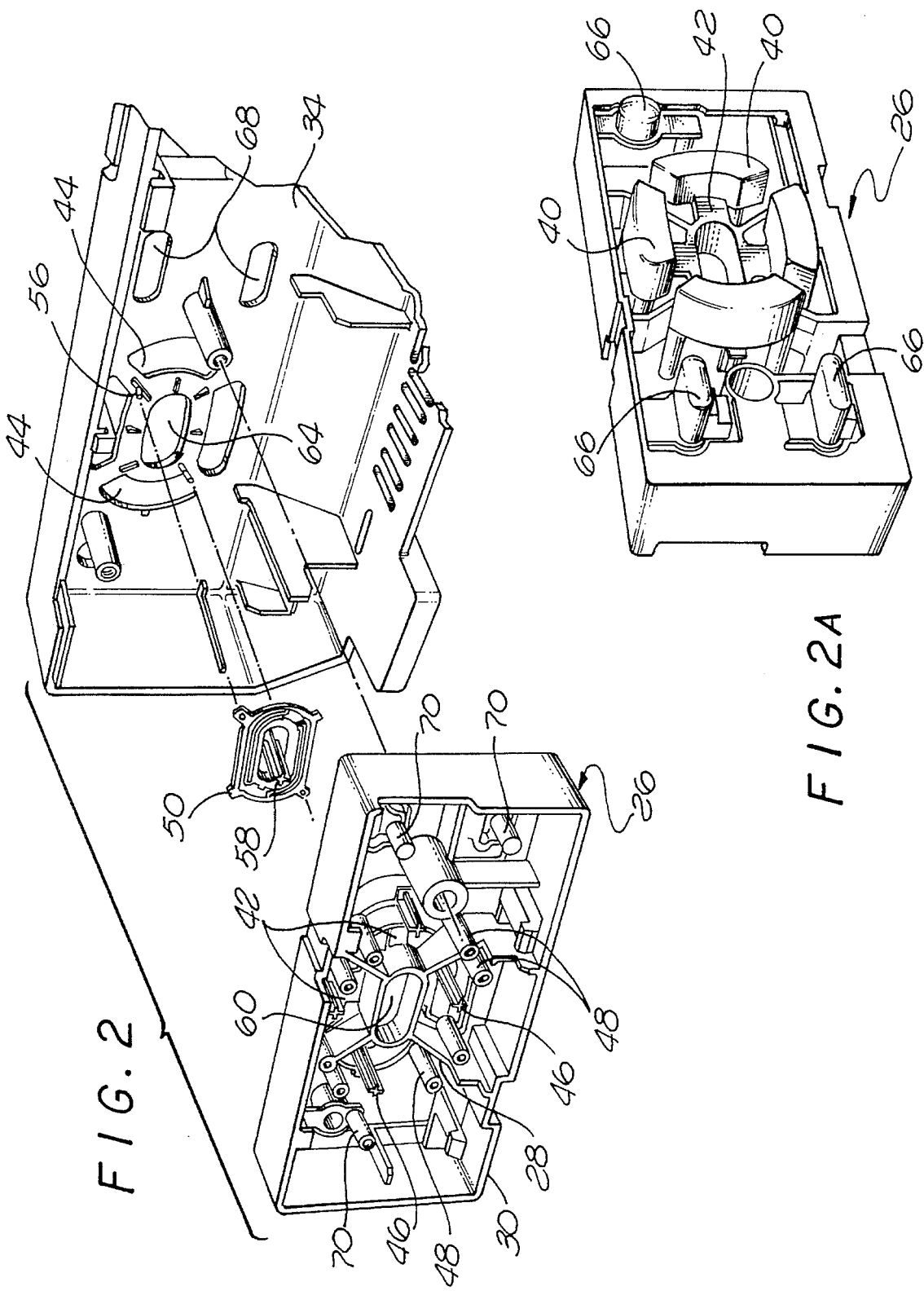
FIG. 2 is an exploded view of a button assembly.
Figure 3:
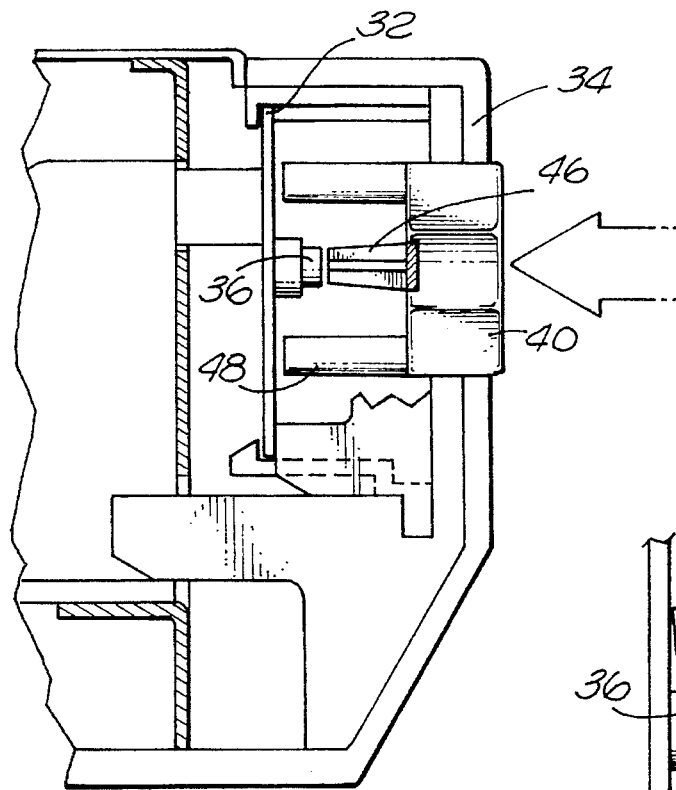
FIG. 3 is a side sectional view showing a column that couples a button to a microswitch of the control box.

FIGS. 2, 2a and 3 shows a button assembly 24 of the control box 10. The button assembly 24 includes a button plate 26 which has a truss 28 that extends from an outer housing 30. The button plate 26 is mounted to a printed circuit board 32 which is attached to a front panel member 34 of the control box 10. The printed circuit board 32 has a plurality of microswitches 36. Applying a pressure to the microswitches 36 provides a corresponding input command to the control box 10.

A plurality of outer buttons 40 are cantilevered from the truss 28 of the button plate 26 by strips 42. The strips 42 are flexible enough to allow the buttons 40 to be easily depressed by the end user. The outer buttons 40 extend through corresponding openings 44 in the front panel 34 so that the end user can access and depress the buttons 40.

Figure 3A:
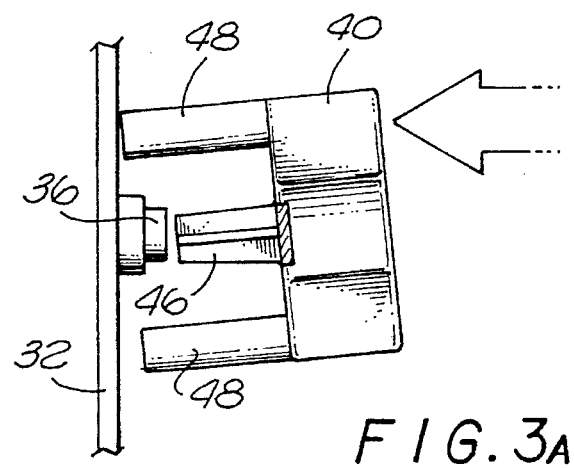
FIG. 3a is a side view showing an outer button engaging a printed circuit board.

Extending from each outer button 40 is a switch column 46 that can engage and apply a pressure to an adjacent microswitch 36. The deflection of an outer button 40 pushes the switch column 46 into the corresponding microswitch 36. As shown in FIG. 3a, each outer button 40 also has a pair of support columns 48 located at the ends of the button 26. When the end user pushes on one end of the button 40, the support column 48 will engage the printed circuit board 32 and limit further movement of the button 40. The support columns 48 limit the movement of the buttons 40 and the stresses on the strips 42, thereby improving the life and reliability of the control box 10.

Figure 4:
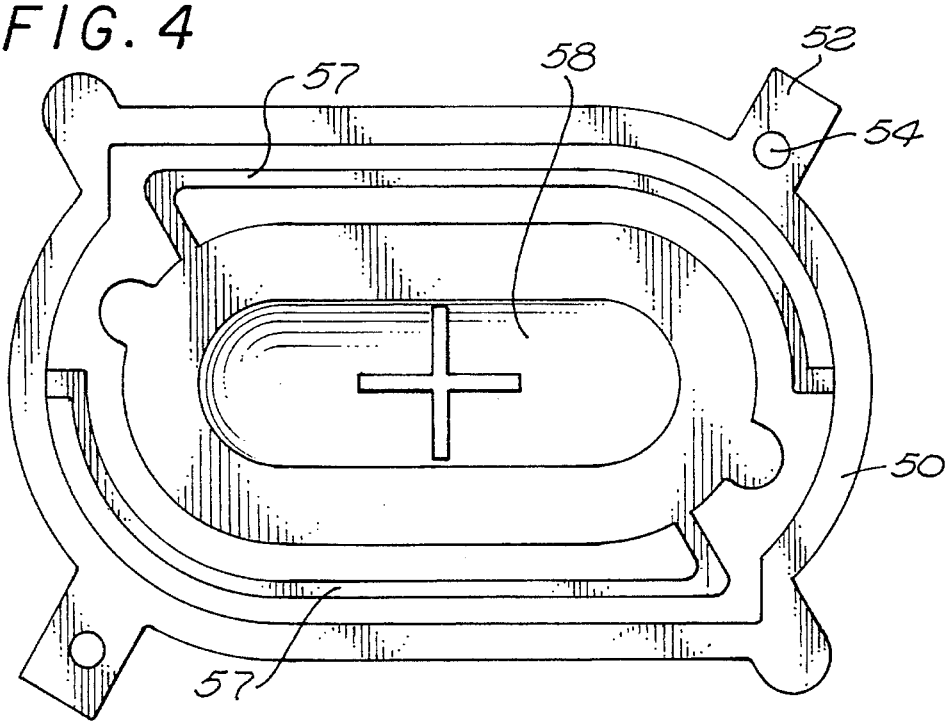
FIG. 4 is a rear perspective view of a center button.

Referring to FIGS. 2 and 4, the button assembly 24 includes a center button bracket 50 that is mounted to the front panel 34. The bracket 50 includes a plurality or tabs 52 that each have an aperture 54. Each aperture 54 receives a corresponding stud 56 that extends from the front panel 34. Cantilevered from the bracket 50 by segments 57 is a center button 58. The center button 58 may have an unsymmetrical contoured surface which corresponds to a radial shape of the front panel 34. To insure that the center button 58 is assembled in the proper orientation, the tab apertures 54 and corresponding studs 56 of each tab 52 may have different cooperating diameters, so that each tab 52 can only be attached to a corresponding stud 56.

The center button 58 has a switch column 60 that extends through a center opening 62 in the button plate truss 28. The switch column 60 engages a corresponding microswitch 36 when the center button 58 is depressed by the end user. The center button 58 also extends through a corresponding opening 64 in the front panel 34.

The button plate 26 is typically molded as a single plastic piece to reduce the cost of producing the control box 10. Additionally, mounting the center button 58 to the front panel 34 also reduces the complexity and cost of assembling the control box 10. The button plate 26 may have additional buttons 66 that are cantilevered from the outer housing 30 of the button plate 26 and extend through corresponding openings 68 in the front panel. The buttons 66 also have switch columns 70 that engage corresponding microswitches 36 of the circuit board 32 to provide additional input functions for the control box 10.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A button assembly for a television receiver control box which has a front panel and a plurality of microswitches mounted to a printed circuit board, comprising:

a button plate located between the front panel and the printed circuit board, said button plate having a truss which has a center opening, a plurality of first buttons located about said center opening, said first buttons being cantilevered radially outward from said truss, each said first button having a first column that is adjacent to a corresponding microswitch and engages the microswitch when each said first button is depressed; and, a center bracket that is mounted to the front panel, a center button that is cantilevered from said center bracket and located adjacent to said first buttons, said center button has a center column that extends through said center opening of said button plate, said center column being adjacent to a corresponding microswitch and engages the microswitch when said center button is depressed.

2. The button assembly as recited in claim 1, wherein each first button has a pair of support columns that extend from opposite ends of said first button and engage the printed circuit board when an end of said first button is depressed.

3. The button assembly as recited in claim 1, wherein said truss extends from a button plate outer housing that is mounted to the printed circuit board.

4. The button assembly as recited in claim 3, wherein said button plate has a plurality of second buttons cantilevered from said button plate outer housing.

5. The button assembly as recited in claim 1, wherein said center bracket has an aperture that cooperates with a stud which extends from the front panel to orient said center button relative to the front panel.

6. A television receiver control box, comprising:

a housing;

a front panel attached to said housing;

a printed circuit board attached to said housing;

a plurality of microswitches mounted to said printed circuit board;

a button plate located between said front panel and said printed circuit board, said button plate having a truss which has a center opening, a plurality of first buttons located about said center opening, said first buttons being cantilevered radially outward from said truss, each said first button having a first column that is adjacent to a corresponding microswitch and engages the microswitch when each said first button is depressed; and, a center bracket that is mounted to said front panel, a center button that is cantilevered from said center bracket and located adjacent to said first buttons, said center button has a center column that extends through said center opening of said button plate, said center column being adjacent to a corresponding microswitch and engages the microswitch when said center button is depressed.

7. The control box as recited in claim 6, wherein each first button has a pair of support columns that extend from opposite ends of said first button and engage said printed circuit board when an end of said first button is depressed.

8. The control box as recited in claim 6, wherein said truss extends from a button plate outer housing that is mounted to said printed circuit board.

9. The control box as recited in claim 8, wherein said button plate has a plurality of second buttons cantilevered from said button plate outer housing.

10. The control box as recited in claim 6, wherein said center bracket has an aperture that cooperates with a stud which extends from said front panel to orient said center button relative to said front panel.

\* \* \* \* \*